(12) United States Patent
Kim et al.

(10) Patent No.: US 11,169,535 B2
(45) Date of Patent: Nov. 9, 2021

(54) VEHICLE AND METHOD OF LOCATIONING THE SAME

(71) Applicants: Hyundai Motor Company, Seoul (KR); Kia Motors Corporation, Seoul (KR); Hyundai Autron Co., Ltd., Seongnam-si (KR)

(72) Inventors: Hyun-Woo Kim, Yongin-si (KR); Bong Ju Kim, Yongin-si (KR); Jong-Yoon Yee, Seoul (KR); SungYun Kim, Seoul (KR)

(73) Assignees: Hyundai Motor Company, Seoul (KR); Kia Motors Corporation, Seoul (KR); Hyundai Autoever Corp., Seoul (KR)

( * ) Notice: Subject to any disclaimer, the term of this patent is extended or adjusted under 35 U.S.C. 154(b) by 259 days.

(21) Appl. No.: 16/415,031

(22) Filed: May 17, 2019

(65) Prior Publication Data

US 2020/0209883 A1 Jul. 2, 2020

(30) Foreign Application Priority Data

Dec. 28, 2018 (KR) .......................... 10-2018-0171755

(51) Int. Cl.
 *G05D 1/02* (2020.01)
 *G05D 1/00* (2006.01)
 *G07C 5/08* (2006.01)

(52) U.S. Cl.
 CPC ......... *G05D 1/0268* (2013.01); *G05D 1/0055* (2013.01); *G05D 1/0088* (2013.01); *G05D 1/0278* (2013.01); *G07C 5/08* (2013.01)

(58) Field of Classification Search
 CPC .............. G05D 1/0268; G05D 1/0278; B60W 2050/0215
 See application file for complete search history.

(56) References Cited

U.S. PATENT DOCUMENTS

2016/0071418 A1* 3/2016 Oshida ................ B60W 30/165
 701/23
2020/0234574 A1* 7/2020 Park ................... G06K 9/00798

* cited by examiner

*Primary Examiner* — Thomas G Black
*Assistant Examiner* — Ana D Thomas
(74) *Attorney, Agent, or Firm* — Morgan, Lewis & Bockius LLP

(57) ABSTRACT

The present disclosure relates to a vehicle and a method of controlling the same, for keeping safe autonomous travel by calculating and using an estimated location on the basis of another vehicle information in case of occurrence of an error in estimating the location of a vehicle due to a sensor fault during autonomous driving. The method includes steps of: obtaining internal location data from an inside source of the vehicle and calculating an internal absolute location of the vehicle based on the internal location data for determining a location of the vehicle; obtaining external location data from an outside source of the vehicle and calculating an external absolute location of the vehicle based on the external location data for determining a location of the vehicle; and selecting at least one of the internal absolute location and the external absolute location as a current location of the vehicle.

20 Claims, 6 Drawing Sheets

VEHICLE AND METHOD OF LOCATIONING THE SAME

CROSS-REFERENCE TO RELATED APPLICATION

This application is based on and claims the benefit of priority to Korean Patent Application No. 10-2018-0171755, filed on Dec. 28, 2018 in the Korean Intellectual Property Office, the disclosure of which is incorporated herein by reference.

TECHNICAL FIELD

The present disclosure relates to a vehicle, and more specifically, to a safe driving control of a vehicle.

BACKGROUND

With development of high-tech and information technology (IT) industry, unmanned technology has been researched and developed to be applied in various fields. In particular, vehicle industries undergo change toward environmentally friendly and advanced vehicles with combination of recent IT technologies. With the development of vehicle technology, intelligent vehicles employing accident prevention, accident avoidance, collision safety, convenience improvement, vehicle intelligence, autonomous driving technology, and the like for driver safety and convenience enhancement are being commercialized.

Such an intelligent vehicle represents a vehicle that supports convenience functions through an assistance technology of assisting unskilled driver in manipulation, a speech recognition technology, and the like, and is characterized in reducing accidents caused by driver's negligence, and reducing time, fuel waste, exhaust gas, and the like.

An autonomous driving vehicle is an integration of intelligent vehicle technologies, and when a driver, riding the vehicle, designates a desired destination, the vehicle may generate an optimal route on the basis of the current location or destination without additional manipulation.

In addition, the autonomous driving vehicle recognizes traffic signal and traffic signs of the road, maintains proper speed according to the traffic situation, recognizes a failure situation and actively copse with an accident, maintains the lane by itself, and travels to a desired destination while changing the lanes, passing vehicles, or properly steering to avoid obstacles if necessary.

As described above, many studies have been actively conducted on the autonomous driving of autonomous driving vehicles, and an autonomous driving system may autonomously control driving of a vehicle such that the vehicle moves from a departure point to a destination on a road, by using GPS position information and signals obtained from various sensors on the basis of road map information.

That is, the autonomous driving system identifies a surrounding environment of the vehicle through various types of sensors provided in the vehicle, and transmits commands through various driving controller provided in the vehicle on the basis of the identified surrounding environment such that the vehicle performs autonomously driving.

In this case, when the sensors provided in the vehicle do not operate normally, the abnormal operation is not easily identified by a pedestrian at a surrounding of the vehicle or the driver of the vehicle, so that the vehicle is not normally subject to autonomous driving control.

The information disclosed in this Background section is only for enhancement of understanding of the general background of the inventive concepts and may not be taken as an acknowledgement or any form of suggestion that this information forms prior art already known to a person skilled in the art.

SUMMARY

One object of the present disclosure is to provide a vehicle and a method of controlling the same, capable of continuously performing safe autonomous driving by calculating and using a location of the vehicle estimated on the basis of another vehicle, in case of occurrence of an error in estimating the location of the vehicle due to a sensor fault during autonomous driving.

Additional aspects of the present disclosure will be set forth in part in the description which follows and, in part, will be obvious from the description, or may be learned by practice of the present disclosure.

According to one aspect of the present disclosure, a method of controlling a vehicle may include steps of: obtaining internal location data from at least one inside source of the vehicle and calculating an internal absolute location of the vehicle based on the internal location data for determining a location of the vehicle; obtaining external location data from at least one outside source and calculating an external absolute location of the vehicle based on the external location data for determining a location of the vehicle; and selecting at least one of the internal absolute location and the external absolute location as a current location of the vehicle.

The internal location data may be obtained using at least one of a camera, a radar, or a lidar that are installed in the vehicle, or map information.

The external location data may be obtained using at least one other vehicle positioned at a surrounding of the vehicle.

The method may further include a step of comparing an error between the internal absolute location and the external absolute location with a predetermined threshold value.

The step of selecting may include selecting the internal absolute location as the current location of the vehicle when the error between the internal absolute location and the external absolute location is smaller than the predetermined threshold value.

The step of selecting may include selecting the external absolute location as the current location of the vehicle when the error between the internal absolute location and the external absolute location is equal to or larger than the predetermined threshold value.

The method may further include a step of moving the vehicle to a safe zone and stopping the vehicle when the error between the internal absolute location and the external absolute location is equal to or larger than the predetermined threshold value.

The method may further include a step of controlling the vehicle according to one selected between the internal absolute location and the external absolute location.

The method may further include a step of performing a autonomous driving of the vehicle according to the one selected between the internal absolute location and the external absolute location.

The step of controlling the vehicle may include correcting the internal absolute location by referring to the external absolute location.

According to another aspect of the present disclosure, a vehicle may include a controller configured to: obtain internal location data from at least one inside source of the vehicle and calculate an internal absolute location of the vehicle based on the internal location data for determining a location of the vehicle; obtain external location data from at least one outside source and calculate an external absolute location of the vehicle based on the external location data for determining a location of the vehicle; and select at least one of the internal absolute location and the external absolute location as a current location of the vehicle.

The internal location data may be obtained using at least one of a camera, a radar, or a lidar that are installed in the vehicle, or map information.

The external location data may be obtained using at least one other vehicle positioned at a surrounding of the vehicle.

The controller may compare an error between the internal absolute location and the external absolute location with a predetermined threshold value.

The controller may select the internal absolute location as the current location of the vehicle when the error between the internal absolute location and the external absolute location is smaller than the predetermined threshold value.

The controller may select the external absolute location as the current location of the vehicle when the error between the internal absolute location and the external absolute location is equal to or larger than the predetermined threshold value.

The vehicle may be controlled to move to a safe zone and to stop the vehicle when the error between the internal absolute location and the external absolute location is equal to or larger than the predetermined threshold value.

The vehicle may be controlled according to one selected between the internal absolute location and the external absolute location.

The vehicle may be controlled by autonomous driving according to the one selected between the internal absolute location and the external absolute location.

The vehicle may be controlled by correcting the internal absolute location by referring to the external absolute location.

BRIEF DESCRIPTION OF THE DRAWINGS

The vehicle and method controlling the same of the present disclosure have other features and other advantages which will become apparent from or set forth in more detail in the following description of exemplary embodiments, taken in conjunction with the accompanying drawings, which together serve to explain certain principles of the present disclosure. The accompanying drawings are as follows.

It is to be understood that the appended drawings are not necessarily drawn to scale, and are presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment.

DETAILED DESCRIPTION

Hereinbelow, exemplary embodiments of the present disclosure will be described in detail with reference to the accompanying drawings. While the present disclosure will be described in conjunction with exemplary embodiments thereof, it is to be understood that the following description is not intended to limit the present disclosure to those exemplary embodiments. On the contrary, the description is intended to cover not only the exemplary embodiments, but also various alternatives, modifications, equivalents, and other embodiments that may be included within the spirit and scope of the present disclosure as embodied by the appended claims. Throughout the drawings, the same reference numerals will refer to the same or like parts.

Figure 1:
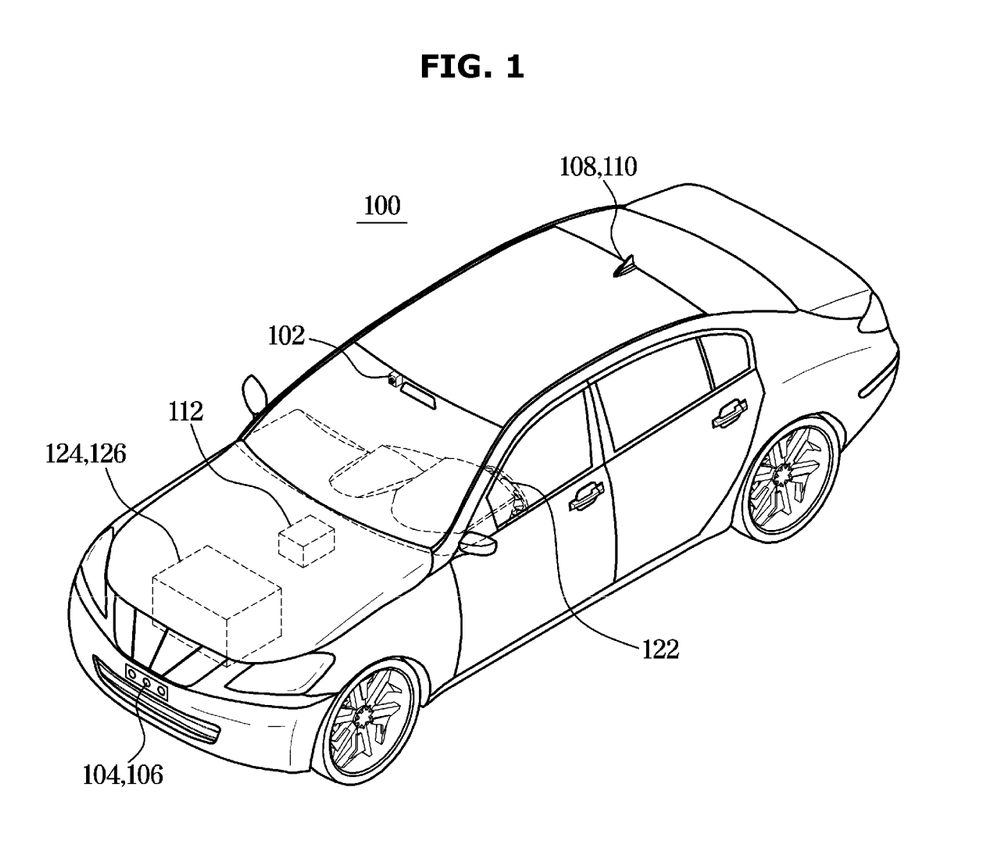
FIG. 1 is an illustrative view showing a vehicle according to an exemplary embodiment of the present disclosure.

FIG. 1 is an illustrative view showing a vehicle according to an exemplary embodiment of the present disclosure.

Referring to FIG. 1, a vehicle 100 according to the exemplary embodiment of the present disclosure includes a camera 102, a front radar 104, a front lidar 106, a global positioning system (GPS) device 108, a vehicle to everything (V2X) device 110, a controller 112, a motor driven power steering (MDPS) 122, an electronic stability control (ESC) 124, and a power train 126. Each of these will be described in detail with reference to FIG. 2 below.

Figure 2:
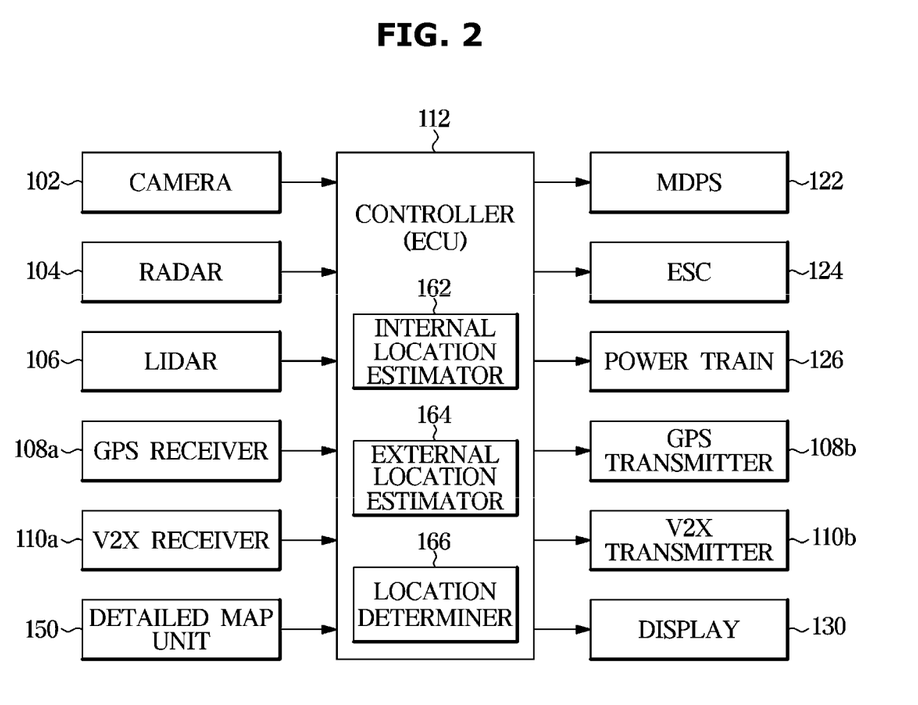
FIG. 2 is a block diagram showing an illustrative control system of a vehicle according to an exemplary embodiment of the present disclosure.

FIG. 2 is a block diagram showing an illustrative control system of a vehicle according to an exemplary embodiment of the present disclosure.

According to an exemplary embodiment of the present disclosure, the controller 112 is provided to control the operation of the vehicle 100. For this, the controller 112 communicates with the camera 102, the front radar 104, the front lidar 106, the GPS device 108, the V2X device 110, and a detailed map unit 150, and transmits or receives information thereto/therefrom. The controller 112 generates a control command for controlling the MDPS 122, the ESC 124, the power train 126, and a display 130 to control the MDPS 122, the ESC 124, the power train 126, and the display 130. The controller 112 may be an electronic control unit (ECU) provided in the vehicle 100.

The camera 102 may be installed adjacent to a room mirror in an interior boarding space of the vehicle 100 or may be integrally formed with the inside the room mirror. The camera 102 is provided to photograph a surrounding area of the vehicle 100 to generate an image.

The radar 104 is installed in an air inlet or a radiator grille in the front of the vehicle 100. The radar 104 is used to detect another vehicle travelling at a surrounding area of the vehicle 100 to measure the traveling speed and the location of the vehicle 100 and the distance to the other vehicle. In addition, the radar 104 may also detect pedestrians located around the vehicle 100.

The lidar 106 is also installed in the air inlet or radiator grille in the front of the vehicle 100. The lidar 106 is used to detect another vehicle travelling at a surrounding of the vehicle 100 to measure the traveling speed and the location of the vehicle 100, and distance of the other vehicle. In addition, the lidar 106 may also detect pedestrians located around the vehicle 100.

The GPS device 108 of the vehicle 100 is provided to communicate with GPS satellites. To this end, the GPS device 108 includes a GPS receiver 108*a* and a GPS transmitter 108*b*. The GPS device 108 may obtain GPS coordinates of the vehicle 100 through communication with the GPS satellites.

The V2X device 110 of the vehicle 100 is provided to perform V2X communication. V2X communication refers to 'Vehicle to Everything' and may be interpreted as 'communication between a vehicle and an object (a human)'. The V2X device 110 includes a V2X receiver 110*a* and a V2X communicator 110*b*. V2X communication will be described in detail with reference to FIG. 3 below.

The detailed map unit 150 is mounted on the vehicle 100 and provides map information. For example, the detailed map unit 150 may be a navigation system (not shown) for providing map information.

The MDPS 122 is a device for assisting the steering capability of the vehicle 100 by appropriately operating a motor in consideration of the speed of the vehicle 100 according to a signal sensed through a sensor connected to the steering wheel such that a steering wheel is controlled.

The ESC 124 is a device for stably controlling the posture of the vehicle body to prevent the vehicle body from being out of balance due to a sudden start of the vehicle 100 when a sudden situation occurs during driving. The ESC 124 allows the vehicle 100 to maintain a high level of stability even when the vehicle 100 is suddenly started.

The power train 126 may refer to a series of devices that transmit power in the vehicle 100, including a clutch, a torque converter, a transmission, a propeller shaft, a drive shaft, a differential, and the like.

The display 130 may serve to provide an occupant of the vehicle 100 with information about the current state of the vehicle 100.

The controller 112 may be implemented through a processor (not shown), and the processor may have an associated non-transitory memory storing software instructions which, when executed by the processor, provides the functionalities of an internal location estimator 162, an external location estimator 164, and a location determiner 166. The internal location estimator 162, the external location estimator 164, and the location determiner 166 are provided in the form of software/firmware/hardware in the controller 112 to perform logical operations for location estimation and location determination.

The internal location estimator 162 of the controller 112 estimates the current location (internal absolute location) of the vehicle 100 on the basis of 'internal location data' of the vehicle 100. The 'internal location data' of the vehicle 100 refers to location-related data of the vehicle 100 that is internally obtained from the vehicle 100 without depending on surrounding other vehicles. For example, the 'internal location data' may be location-related data obtained from the camera 102, the radar 104, the lidar 106, the GPS device 108, or the detailed map unit 150 mounted on the vehicle 100. Accordingly, the 'internal absolute location' calculated by the internal location estimator 162 refers to an absolute location of the vehicle 100 calculated using the 'internal location data'. The calculation of the 'internal absolute location' using the 'internal location data' may include searching the surrounding area of the vehicle 100 using, for example, at least one of the camera 102, the radar 104, and the lidar 106, and calculating current absolute coordinates of the vehicle 100 from a result of the search. Alternatively, the calculation of the 'internal absolute location' using the 'internal location data' may include receiving a GPS signal from the GPS satellites via the GPS device 108 and calculating current absolute coordinates of the vehicle 100 through coordinates of the received GPS signal. Alternatively, the coordinates obtained from the GPS signal may be substituted into the detailed map unit 150 to calculate the current location of the vehicle 100 on a detailed map. In other words, the internal location estimator 162 calculates the current location of the vehicle 100 using the location-related data of the vehicle 100 obtained internally from the vehicle 100 without depending on surrounding other vehicles.

The external location estimator 164 of the controller 112 estimates the current location (external absolute location) of the vehicle 100 on the basis of 'external location data' of the vehicle 100. The 'external location data' of the vehicle 100 refers to location-related data of the vehicle 100 that is externally obtained by the vehicle 100 from surrounding other vehicles. For example, 'external location data' is location-related data relative to other vehicles that is obtained through communication with the other vehicles located around the vehicle 100. Accordingly, the 'external absolute location' calculated by the external location estimator 164 refers to an absolute location of the vehicle 100 calculated using the 'external location data'. The calculation of the 'external absolute location' using 'external location data' may include obtaining relative distance and direction information of one or two other vehicles and the vehicle 100 through communication between the one or two other vehicles and the vehicle 100, and calculating the location of the vehicle 100 with respect to the other vehicles on the basis of the obtained information (see FIG. 5) Alternatively, the calculation of the 'external absolute location' using 'external location data' may include obtaining relative distance and direction information of three or more other vehicles and the vehicle 100 through communication between the three or more other vehicles and the vehicle 100, and calculating the location of the vehicle 100 with respect to the three or more other vehicles using the triangulation on the basis of the obtained information (see FIG. 6).

The location determiner 166 of the controller 112 determines the current location of the vehicle 100 by cross-referencing the internal absolute location coordinates calculated by the internal location estimator 162 and the external absolute location coordinates calculated by the external location estimator 164.

Figure 3:
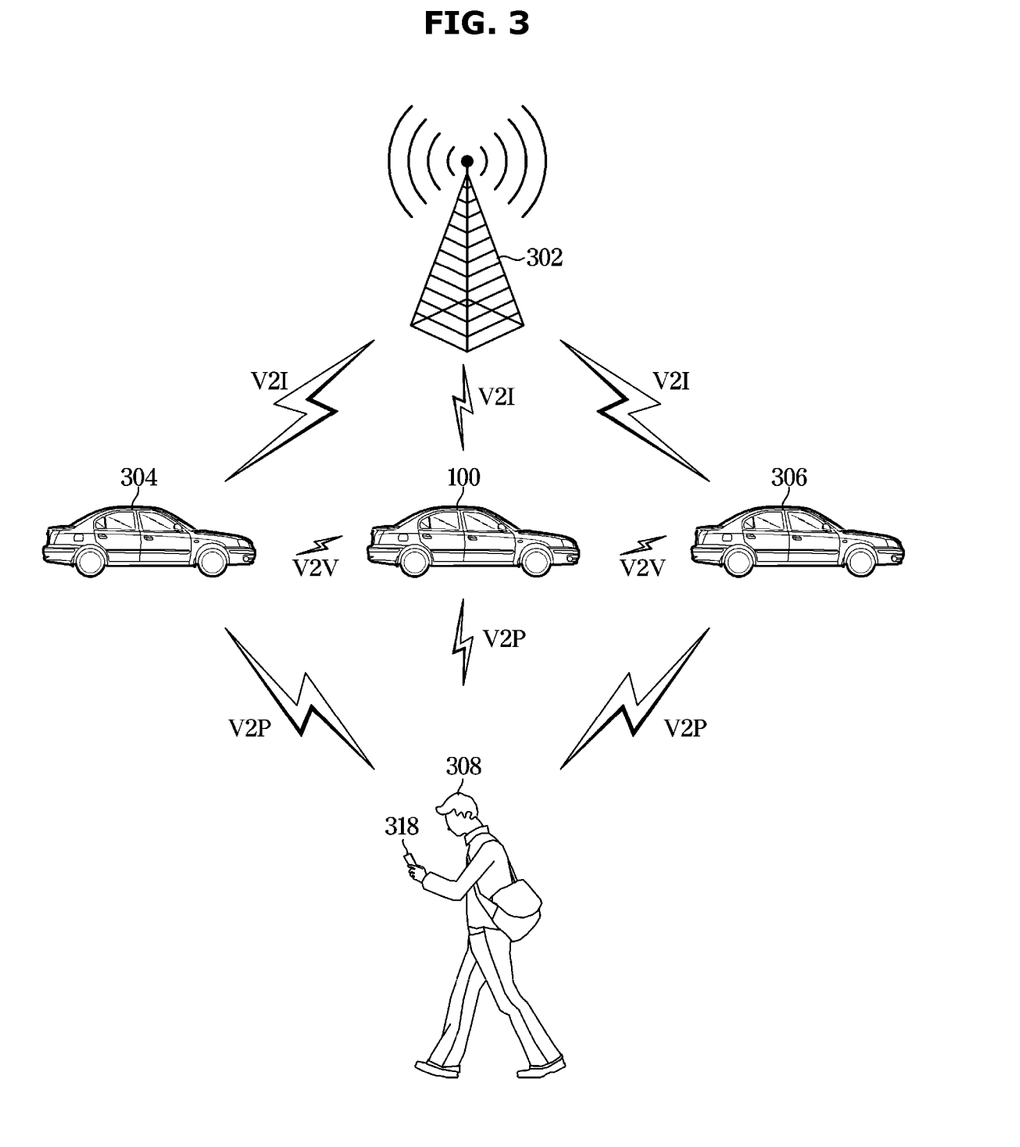
FIG. 3 is an illustrative view showing V2X communication of a vehicle according to an exemplary embodiment of the present disclosure.

FIG. 3 is an illustrative view showing V2X communication of a vehicle according to an exemplary embodiment of the present disclosure.

V2X communication refers to 'vehicle to everything' and may be interpreted as 'communication between a vehicle and an object (a human)'. Referring to FIG. 3, the V2X communication is a technology for the vehicle 100 on running to exchange and share road infrastructure information, traffic information, pedestrian information, and the like through wireless communication. V2X communication is implemented based on a vehicle, for example, Vehicle to Infrastructure (V2I), Vehicle to Vehicle (V2V), and Vehicle to Pedestrian (V2P).

The vehicle 100 according to the exemplary embodiment of the present disclosure may exchange information about a surrounding circumstance of the vehicle 100 through V2X communication with a V2X base station 302 around the vehicle 100 or other vehicles 304 and 306 and a mobile device 318 of a pedestrian 308. To this end, the vehicle 100 performs V2I communication with the V2X base station 302, performs V2V communication with the other vehicles 304 and 306, and performs V2P communication with the mobile device 318 of the pedestrian 308.

Strictly speaking, V2P communication refers to communication with the mobile device 318 carried by the pedestrian 308 rather than communication with the pedestrian 308.

The vehicle 100 performs bidirectional communication to construct a safe and pleasant driving environment by exchanging messages through V2I communication, V2V communication, and V2P communication.

Figure 4:
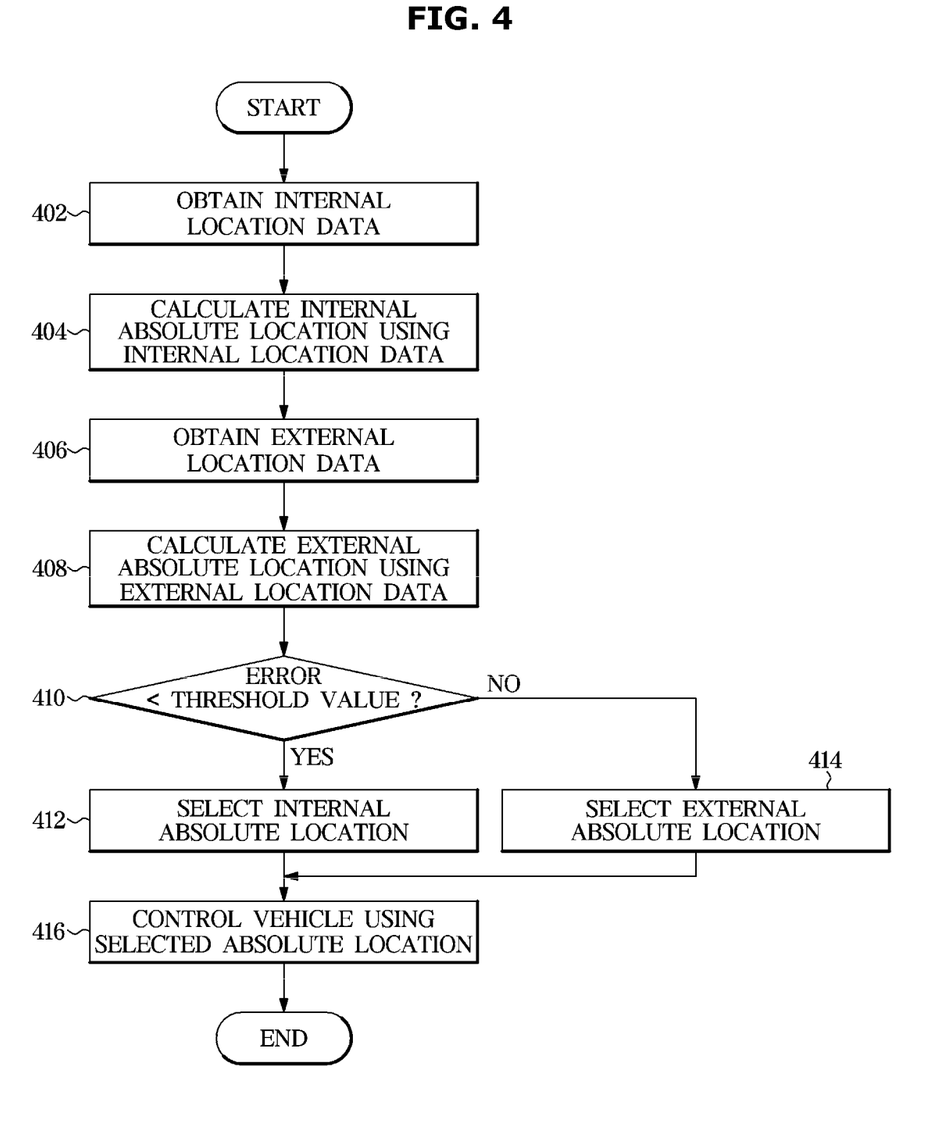
FIG. 4 is a flowchart illustratively showing a method of controlling a vehicle according to an exemplary embodiment of the present disclosure.

FIG. 4 is a flowchart illustratively showing a method of controlling a vehicle according to an exemplary embodiment of the present disclosure.

The controller 112 obtains the internal location data to determine the location of the vehicle 100 (402). The 'internal location data' of the vehicle 100 refers to location-related data of the vehicle 100 internally obtained from the vehicle 100 without depending on surrounding other vehicles. For example, the 'internal location data' is location-related data of the vehicle 100, which is obtained from the camera 102, the radar 104, the lidar 106, the GPS device 108, and the detailed map unit 150 mounted on the vehicle 100.

The internal location estimator 162 of the controller 112 calculates the current location (internal absolute location) of the vehicle 100 on the basis of the 'internal location data' of the vehicle 100 (404).

The controller 112 obtains the external location data to determine the location of the vehicle 100 (406). The "external location data" of the vehicle 100 refers to location-related data of the vehicle 100 externally obtained by the vehicle 100 from surrounding other vehicles. For example, 'external location data' is location-related data relative to other vehicles obtained through communication with the other vehicles located around the vehicle 100.

The external location estimator 164 of the controller 112 calculates the current location (external absolute location) of the vehicle 100 on the basis of the 'external location data' of the vehicle 100 (408). The calculation of the external absolute location by the external location estimator 164 will be described in more detail with reference to FIG. 5.

The location determiner 166 of the controller 112 compares the internal absolute location with the external absolute location to check an existence of an error between the internal absolute location and the external absolute location, and when the error exists, checks the degree to which the error is different from a threshold value that serves as a criterion for comparison (410). That is, it is checked whether the error between the internal absolute location and the external absolute location is smaller than the threshold value.

When the error between the internal absolute location and the external absolute location is smaller than the threshold value (YES in operation 410), the location determiner 166 of the controller 112 selects the internal absolute location calculated by the internal location estimator 162 as the current location of the vehicle 100 (412). The error between the internal absolute location and the external absolute location being smaller than the threshold value represents that the internal absolute value is sufficiently reliable. Accordingly, the internal absolute location may be selected for the control of the vehicle 100.

When the error between the internal absolute location and the external absolute location is equal to or greater than the threshold value (NO in operation 410), the location determiner 166 of the controller 112 selects the external absolute location calculated by the external location estimator 164 as the current location of the vehicle 100 (414). The error between the internal absolute location and the external absolute location being equal to or greater than the threshold value represents that the internal location data input to the internal location estimator 162, i.e., the location-related data of the vehicle 100 obtained from the camera 102, the radar 104, the lidar 106, the GPS device 108, and the detailed map unit 150 is not reliable. Accordingly, the external absolute location is selected for safe control of the vehicle 100.

That is, when the internal absolute location is reliable, the vehicle 100 is controlled on the basis of the internal absolute location, and when the internal absolute location is unreliable, the vehicle 100 is controlled on the basis of the external absolute location. In the case of the autonomous driving control of the vehicle 100, controlling the autonomous driving not only using the internal absolute location but also using the external absolute location enables mutual complement between the internal absolute location and the external absolute location, so that the reliability of location information is increased, and in particular, when the internal absolute location is not reliable, the internal absolute location may be replaced with the external absolute location, so that the vehicle 100 may be further safely controlled with fail safe.

When one of the internal absolute location and the external absolute location is selected, the controller 112 controls the vehicle 100 using the selected absolute location (416). The control of the vehicle 100 on the basis of the selected absolute location may be autonomous driving control of the vehicle 100. When the vehicle 100 is subjected to autonomous driving control on the basis of a selected internal absolute location, autonomous driving may be performed based on a given destination and route may be performed. Meanwhile, selecting an external absolute location is regarded that the internal location data input to the internal location estimator 162, i.e., location-related data of the vehicle 100 obtained from the camera 102, the radar 104, the lidar 106, the GPS device 108, and the detailed map unit 150 is unreliable, the autonomous driving control is performed such that an alarm is generated through the display 130 first to call the driver's attention, and the vehicle is moved to a safety zone for a stop such that a required check and maintenance is performed.

The 'external absolute location' may be used not only when a failure occurs in the camera 102, the radar 104, the lidar 106, the GPS device 108, and the detailed map unit 150 generating internal location data, but also when the camera 102, the radar 104, the lidar 106, and the like are contaminated due to deterioration of weather or road condition.

In addition, the 'external absolute location' may be used to correct the 'internal absolute location'. That is, when the internal absolute location is calculated using the internal location data obtained from the camera 102, the radar 104, the lidar 106, the GPS device 108, and the detailed map unit 150, the internal absolute location is compared with the external absolute position so that an error of the internal absolute location is corrected.

Figure 5:
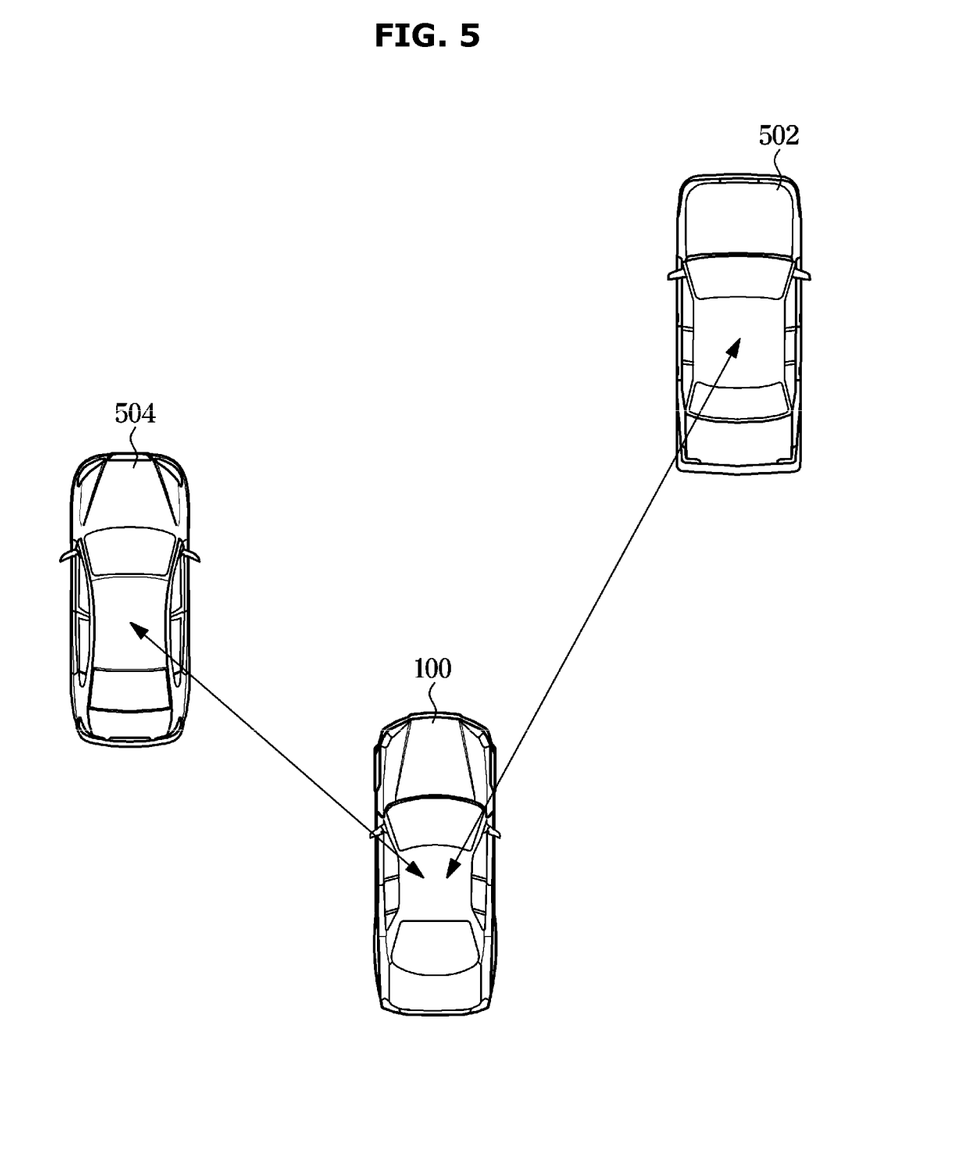
FIG. 5 is an illustrative view showing location estimation using an arithmetic mean according to an exemplary embodiment of the present disclosure.

FIG. 5 is an illustrative view showing location estimation using an arithmetic mean according to an exemplary embodiment of the present disclosure.

In the calculation of the external absolute location, when only a single nearby vehicle exists, an absolute location of the vehicle 100 according to the present disclosure calculated from the single nearby vehicle is used. When two nearby vehicles exist, location information of the vehicle 100 according to the present disclosure calculated from the basis of the two nearby vehicles is arithmetically averaged to calculate an external absolute location of the vehicle 100.

For example, referring to FIG. 5, when two vehicles, that is, a first vehicle 502 and a second vehicle 504, are present around the vehicle 100 according to the present disclosure, the first vehicle 502 calculates absolute locations (x and y coordinates) of the second vehicle 504 and the vehicle 100 according to the present disclosure using relative distances of objects (including the vehicles) sensed by a sensor of the first vehicle 502. The second vehicle 504 also calculates absolute locations (x and y coordinates) of the first vehicle 502 and the vehicle 100 according to the present disclosure using relative distances of objects (including the vehicles) sensed by a sensor of the second vehicle 504. The vehicle 100 according to the present disclosure receives the absolute locations calculated by the first vehicle 502 and the second vehicle 504 via V2X communication, and the external location estimator 164 of the controller 112 calculates the external absolute location of the vehicle 100 by arithmetically averaging the absolute locations of the vehicle 100 received from the two vehicles 502 and 504.

Figure 6:
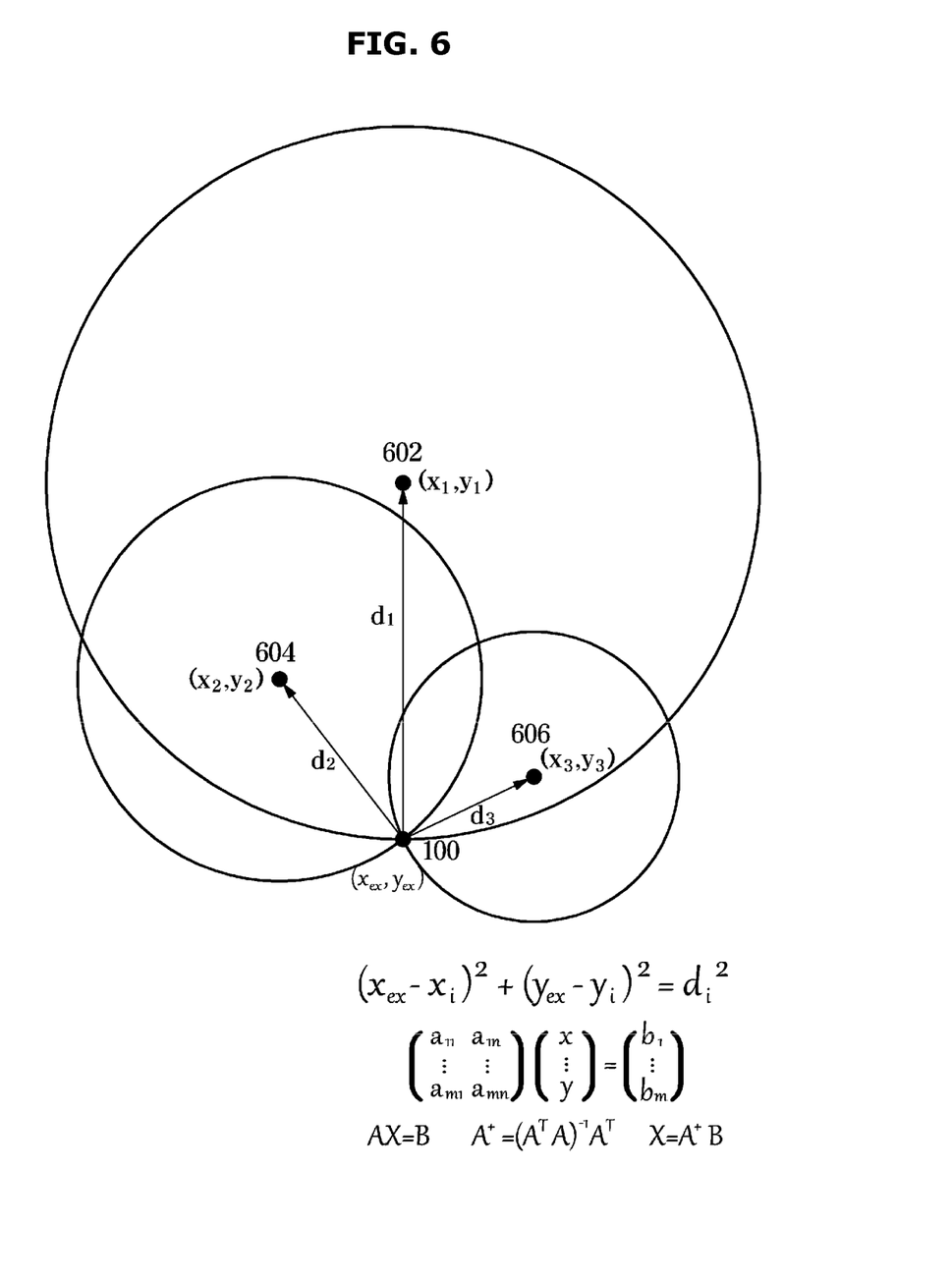
FIG. 6 is an illustrative view showing location estimation using triangulation according to an exemplary embodiment of the present disclosure.

FIG. 6 is an illustrative view showing location estimation using triangulation according to an exemplary embodiment of the present disclosure. When three or more nearby vehicles exist, an external absolute location of the vehicle 100 according to the present disclosure is calculated through the triangulation as shown in FIG. 6.

Referring to FIG. 6, at least three nearby vehicles 602, 604, and 606 exist around the vehicle 100 according to the present disclosure, a current location (xex, yex) of the vehicle 100 is calculated through the triangulation technique using absolute coordinates (x, y) of each of the at least three nearby vehicles 602, 604, and 606 and relative distances d of each of the at least three vehicles 602, 604, and 606 from the vehicle 100 according to the present disclosure. Assuming that the mounting positions of sensors of the vehicle 100 according to the present disclosure and the other vehicles 602, 604, and 606 are known, the distances d between the vehicles may be obtained from central positions of the vehicles through the sensor mounting positions (angles) from the centers of the respective vehicles.

When the location (xex, yex) of the vehicle 100 according to the present disclosure is calculated, the absolute locations of the vehicles 602, 604, and 606 and the relative distances may not perfectly match, so there is a need to obtain an approximate value, and to this end, the minimum mean-square error (MMSE) estimation method may be used.

Eliminating squared terms in three equations of the three vehicles 602, 604 and 606 leads to two linear equations, which are expressed in a matrix form as shown in FIG. 6 (n=2, m≥3), and the external absolute location X (xex, yex) of the vehicle 100 according to the present disclosure may be estimated using the following equation as shown in FIG. 6.

As is apparent from the above, the vehicle and the method of controlling the same can continuously perform safe autonomous driving by calculating and using a location of the vehicle estimated on the basis of another vehicle, in case of occurrence of an error in estimating the location of the vehicle due to a sensor fault during autonomous driving.

The above description of the present disclosure is for illustrative purposes, and a person having ordinary skilled in the art should appreciate that other specific modifications may be easily made without departing from the technical spirit or essential features of the present disclosure. Therefore, the above exemplary embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A method of controlling a vehicle, the method comprising steps of:
    obtaining internal location data from detection result of at least one device installed in the vehicle and calculating an internal absolute location of the vehicle based on the internal location data for determining a location of the vehicle;
    obtaining external location data from at least one outside source and calculating an external absolute location of the vehicle based on the external location data for determining a location of the vehicle; and
    selecting at least one of the internal absolute location and the external absolute location as a current location of the vehicle based on an error between the internal absolute location and the external absolute location.

2. The method of claim 1, wherein the internal location data is obtained using at least one of a camera, a radar, or a lidar that are installed in the vehicle, or map information.

3. The method of claim 1, wherein the external location data is obtained using at least one other vehicle positioned at a surrounding of the vehicle.

4. The method of claim 1, further comprising a step of comparing the error between the internal absolute location and the external absolute location with a predetermined threshold value.

5. The method of claim 4, wherein the step of selecting includes selecting the internal absolute location as the current location of the vehicle when the error between the internal absolute location and the external absolute location is smaller than the predetermined threshold value.

6. The method of claim 4, wherein the step of selecting includes selecting the external absolute location as the current location of the vehicle when the error between the internal absolute location and the external absolute location is equal to or larger than the predetermined threshold value.

7. The method of claim 6, further comprising a step of moving the vehicle to a safe zone and stopping the vehicle when the error between the internal absolute location and the external absolute location is equal to or larger than the predetermined threshold value.

8. The method of claim 1, further comprising a step of controlling the vehicle according to one selected between the internal absolute location and the external absolute location.

9. The method of claim 8, further comprising a step of performing an autonomous driving of the vehicle according to the one selected between the internal absolute location and the external absolute location.

10. The method of clam 8, wherein the step of controlling the vehicle includes correcting the internal absolute location by referring to the external absolute location.

11. A controller for a vehicle, the controller configured to:
    obtain internal location data from detection result of at least one device installed in the vehicle and calculate an internal absolute location of the vehicle based on the internal location data for determining a location of the vehicle;
    obtain external location data from at least one outside source and calculate an external absolute location of the vehicle based on the external location data for determining a location of the vehicle; and select at least one of the internal absolute location and the external absolute location as a current location of the vehicle based on an error between the internal absolute location and the external absolute location.

12. The vehicle of claim 11, wherein the internal location data is obtained using at least one of a camera, a radar, or a lidar that are installed in the vehicle, or map information.

13. The vehicle of claim 11, wherein the external location data is obtained using at least one other vehicle positioned at a surrounding of the vehicle.

14. The vehicle of claim 11, wherein the controller compares the error between the internal absolute location and the external absolute location with a predetermined threshold value.

15. The vehicle of claim 14, wherein the controller selects the internal absolute location as the current location of the vehicle when the error between the internal absolute location and the external absolute location is smaller than the predetermined threshold value.

16. The vehicle of claim 14, wherein the controller selects the external absolute location as the current location of the vehicle when the error between the internal absolute location and the external absolute location is equal to or larger than the predetermined threshold value.

17. The vehicle of claim 16, wherein the vehicle is controlled to move to a safe zone and stopping the vehicle when the error between the internal absolute location and the external absolute location is equal to or larger than the predetermined threshold value.

18. The vehicle of claim 11, wherein the vehicle is controlled according to one selected between the internal absolute location and the external absolute location.

19. The vehicle of claim 18, wherein the vehicle is controlled by an autonomous driving according to the one selected between the internal absolute location and the external absolute location.

20. The vehicle of claim 18, wherein the vehicle is controlled by correcting the internal absolute location by referring to the external absolute location.

* * * * *